US008577958B2

(12) United States Patent
Morris

(10) Patent No.: US 8,577,958 B2
(45) Date of Patent: Nov. 5, 2013

(54) METHODS, SYSTEMS, AND COMPUTER PROGRAM PRODUCTS FOR PROCESSING A NON-RETURNABLE COMMAND RESPONSE BASED ON A MARKUP ELEMENT

(76) Inventor: Robert Paul Morris, Raleigh, NC (US)

( * ) Notice: Subject to any disclaimer, the term of this patent is extended or adjusted under 35 U.S.C. 154(b) by 573 days.

(21) Appl. No.: 12/789,550

(22) Filed: May 28, 2010

(65) Prior Publication Data

US 2011/0295933 A1  Dec. 1, 2011

(51) Int. Cl.
*G06F 15/16* (2006.01)
(52) U.S. Cl.
USPC .......................................... 709/203; 709/202
(58) Field of Classification Search
USPC .................. 709/202, 203, 227, 238
See application file for complete search history.

(56) References Cited

U.S. PATENT DOCUMENTS

| 7,587,450 | B2 | 9/2009 | Morris | |
|---|---|---|---|---|
| 2004/0148328 | A1* | 7/2004 | Matsushima | 709/200 |
| 2005/0060427 | A1* | 3/2005 | Phillips et al. | 709/238 |
| 2007/0005725 | A1 | 1/2007 | Morris | |
| 2007/0150814 | A1 | 6/2007 | Morris | |
| 2008/0077653 | A1 | 3/2008 | Morris | |
| 2009/0144753 | A1 | 6/2009 | Morris | |
| 2009/0254627 | A1 | 10/2009 | Morris | |

OTHER PUBLICATIONS

Nielson, H. Frystyk, et al, "HTTP-NG Overview", Internet Draft, 2009-11-17, IETF.
Fielding, R, et al, "Hypertext Transfer Protocol—HTTP/1.1", RFC 2616, 1999-06, IETF.
Gettys, Jim, et al, "The WebMUX Protocol", draft-gettys-webmux-00.txt, Aug. 1, 1998, IETF.
Unknown, "The Internet Needs a Session Layer", http://fanf.livejournal.com/53662.html, Mar. 17, 2006.
Hickson, Ian, editor, "HTML5", Draft Standard, Oct. 3, 2009, Web Hypertext Application Technology Working Group.

* cited by examiner

*Primary Examiner* — Larry Donaghue
*Assistant Examiner* — Marshall McLeod

(57) ABSTRACT

Methods and systems are described for processing a non-returnable command response based on a markup element. In one aspect, a resource is sent to a user agent includes a no-return markup element. A request message is received identifying a command and including no-return-request information based on the resource. The command is processed and no command response is sent for delivery to the user agent in response to receiving the no-return-request information.

In another aspect, a resource including a no-return markup element is received from a server. A determination is made, based on the no-return markup element, that a command identified based on the resource is non-returnable. In response to the determination, a no-return indicator is set to send no command response for the command for delivery to a user agent requesting the command.

19 Claims, 13 Drawing Sheets

```
                    ┌─ 908c
<form>
First name:                         ┌─ 904c
<input type="text" name="first" onblur="log(this.form, non-returnable)" />
<br />
        └─ 906c                                                  └─ 902c
Last name:
<input type="text" name="last" />
</form>
```

Fig. 9c

```
              ┌─ 902d    ┌─ 908d
                                      ┌─ 906d
904d ─┐  <no-return responsemax="10s">
      └─ <form name="input" action="html_form_action.asp" scheme="pubsub"
         method="publish">
         First name: <input type="text" name="FirstName" value="Mickey" /><br />
         Last name: <input type="text" name="LastName" value="Mouse" /><br />
         <input type="submit" value="Submit" />
         </form>
         </no-return>
         Publish something
```

Fig. 9d

```
                    ┌─ 1006    ┌─ 1002
POST www.otherSite.net/path/formHandler.cgi HTTP/1.1
Host: finance.myExample.us.com
User-Agent: Mozilla/5.0 (Windows; U; Windows NT 5.1; en-US; rv: 1.8.0.7) Gecko/
2006010010 Firefox 1.5.0.7
Accept: text/xml,application/xml,application/xhtml+xml,text/html;q=0.10,text/
plain;q=0.8, \
image/png,image/jpeg
Accept-Language: en-us,en;q=0.5
Accept-Encoding: gzip,deflate                                      1000
Accept-Charset: ISO-88510-I,utf-8;q=0.7,*;q=0.7
Keep-Alive: 300
Connection: keep-alive ──────────────── 1008
Cookie: sessionid=AF13BOC ──── 1010
No-Respond: true
Content-Type: application/x-www-form-urlencoded
Content-Length: 32 home=Cosby&favorite+flavor=flies
     ──/
1004
```

Fig. 10

```
                 ┌─1104a   ┌─1102a
                 │         │
POST www.mySite.us/services/log?eventType=onblur HTTP/l.l                    1100a
Host: finance.myExample.us.com
User-Agent: Mozilla/5.0 (Windows; U; Windows NT 5.1; en-US; rv: 1.8.0.7) Gecko/20060909 Firefox
1.5.0.7    ┌─1110a
Accept: text/xml,application/xml,application/xhtml+xml,text/html;q=0.9,text/plain;q=0.8, \
image/png,image/jpeg,multipart/response,empty/*
Accept-Language: en-us,en;q=0.5
Accept-Encoding: gzip,deflate
Accept-Charset: ISO-8859-l,utf-8;q=0.7,*;q=0.7    └─1108a
Keep-Alive: 300
Connection: keep-alive
Cookie: sessionid=AF13BOC
       \
        \            Fig. 11a
         └─1106a
```

Fig. 11a

```
              ┌─1106b
              │
HTTP/l.l 200 OK
Date: Wed, 08 Sep 200417:32:31 GMT
Server: Apache/1.3.27 (Unix) (Red-Hat!Linux) PHP/4.1.2
Last-Modified: Wed, 08 Sep 2004 17:02:40 GMT
MIME-Version: 1.0
Content-Type: empty/*                               1100b
           \       \
            \       └─1102b
             └─1104b
```

Fig.11b

METHODS, SYSTEMS, AND COMPUTER PROGRAM PRODUCTS FOR PROCESSING A NON-RETURNABLE COMMAND RESPONSE BASED ON A MARKUP ELEMENT

RELATED APPLICATIONS

This application is related to the following commonly owned U.S. Patent, the entire disclosure being incorporated by reference herein: U.S. Pat. No. 8,346,853 filed on May 27, 2010, entitled "Methods, Systems, and Program Products for Processing an Attached Command Response".

This application is related to the following commonly owned U.S. Patent Applications, the entire disclosure of each being incorporated by reference herein: Application Ser. No. 12/788,373 filed on May 27, 2010, entitled "Methods, Systems, and Program Products for Preventing Processing of an HTTP Response";

Application Ser. No. 12/789,538 filed on 2010 May 28, entitled "Methods, Systems, and Program Products for Processing an Attached Command Response Based on a Markup Element";

Application Ser. No. 12/788,381 filed on May 27, 2010, entitled "Methods, Systems, and Program Products for Processing a Combined Command Response"; and Application Ser. No. 12/789,568 filed on 2010 May 28, entitled "Methods, Systems, and Program Products for Processing a Combined Command Response Based on a Markup Element".

BACKGROUND

The protocol of the Web, Hypertext Transfer Protocol (HTTP), is a request/response protocol. Browser markup languages, such as hypertext markup language (HTML), are designed to work with the request/response model of HTTP. More particularly, for each HTTP request there is a single HTTP response, unless an error occurs preventing generation and/or return of the response to the requesting user agent. HTTP requests and HTTP responses are communicated over a network connection. Multiple pairs of HTTP request and HTTP response messages can be exchanged over a single connection. HTTP responses must be returned via the connection in the order that their corresponding HTTP requests were exchanged via the connection.

An HTTP request that takes a relatively long time to perform or process by a server holds up HTTP responses to any HTTP requests received afterwards. Depending on the implementation of a particular server, the long-running HTTP request can prevent the particular server from beginning to perform commands identified in any later sent HTTP requests.

HTTP is used by web browsers that interact with people. Delays in responding can be frustrating to people. This frustration may be costly to website providers as users sometimes resubmit requests, wasting the resources of a service provider. Possibly, worse, some users move on to another service provider or other activity.

The issues discussed above are exemplary issues associated with the current request/response model of the Web. Accordingly, there exists a need for methods, systems, and computer program products for processing a non-returnable command response based on a markup element.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for processing a non-returnable command response based on a markup element. In one aspect, the method includes sending, via a network to a user agent node, a first resource including a no-return markup element for identifying no-return-request information for a first command identified based on the first resource. The method further includes, in response to sending the first resource, receiving a first request message identifying the first command, requested by a user agent in the user agent node, and including the no-return-request information specified to identify the first command as non-returnable. The method still further includes processing the first command including, in response to receiving the no-return-request information, sending no command response, for the non-returnable first command, for delivery to the user agent.

Further, a system for processing a non-returnable command response based on a markup element is described. The system includes an execution environment including an instruction-processing unit configured to process an instruction included in at least one of a resource generator component, a request-in component, and a no-return director component. The system includes the resource generator component configured for sending, via a network to a user agent node, a first resource including a no-return markup element for identifying no-return-request information for a first command identified based on the first resource. The system further includes the request-in component configured for in response to sending the first resource, receiving a first request message identifying the first command, requested by a user agent in the user agent node, and including the no-return-request information specified to identify the first command as non-returnable. The system still further includes the no-return director component configured for processing the first command including, in response to receiving the no-return-request information, sending no command response, for the non-returnable first command, for delivery to the user agent.

In another aspect, a method for processing a non-returnable command response based on a markup element is described that includes receiving, for identifying a first command to a server by a user agent, a first resource including a no-return markup element. The method further includes determining based on the no-return markup element that the first command is non-returnable indicating that no command response for the first command is to be sent for delivery from the server to the user agent. The method still further includes setting, in response to the determination, a no-return indicator in a data storage medium to configure a node in a network path including the user agent and the server for sending no command response for the first command for delivery from the server to the user agent. The method also includes sending a first request message identifying the first command for delivery to the server.

Still further, a system for processing a non-returnable command response based on a markup element is described. The system includes an execution environment including an instruction-processing unit configured to process an instruction included in at least one of a resource-in component, a no-response detector component, a no-response director component, and a request-out component. The system includes the resource-in component configured for receiving, for identifying a first command to a server by a user agent, a first resource including a no-return markup element. The system further includes the no-response detector component configured for determining based on the no-return markup element that the first command is non-returnable indicating that no command response for the first command is to be sent for delivery from the server to the user agent. The system still further includes the no-response director component configured for setting, in response to the determination, a no-return indicator in a data storage medium to configure a node in a network path including the user agent and the server for sending no command response for the first command for delivery from the server to the user agent. The system also includes the request-out component configured for sending a first request message identifying the first command for delivery to the server.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 9c illustrates markup information including an exemplary markup element according to the subject matter described herein;

FIG. 9d illustrates markup information including an exemplary markup element according to the subject matter described herein;

FIG. 10 illustrates an exemplary request message according to an aspect of the subject matter described herein;

FIG. 11a Illustrates an exemplary request message according to an aspect of the subject matter described herein; and FIG. 11b illustrates an exemplary response message according to an aspect of the subject matter described herein.

DETAILED DESCRIPTION

Figure 1:
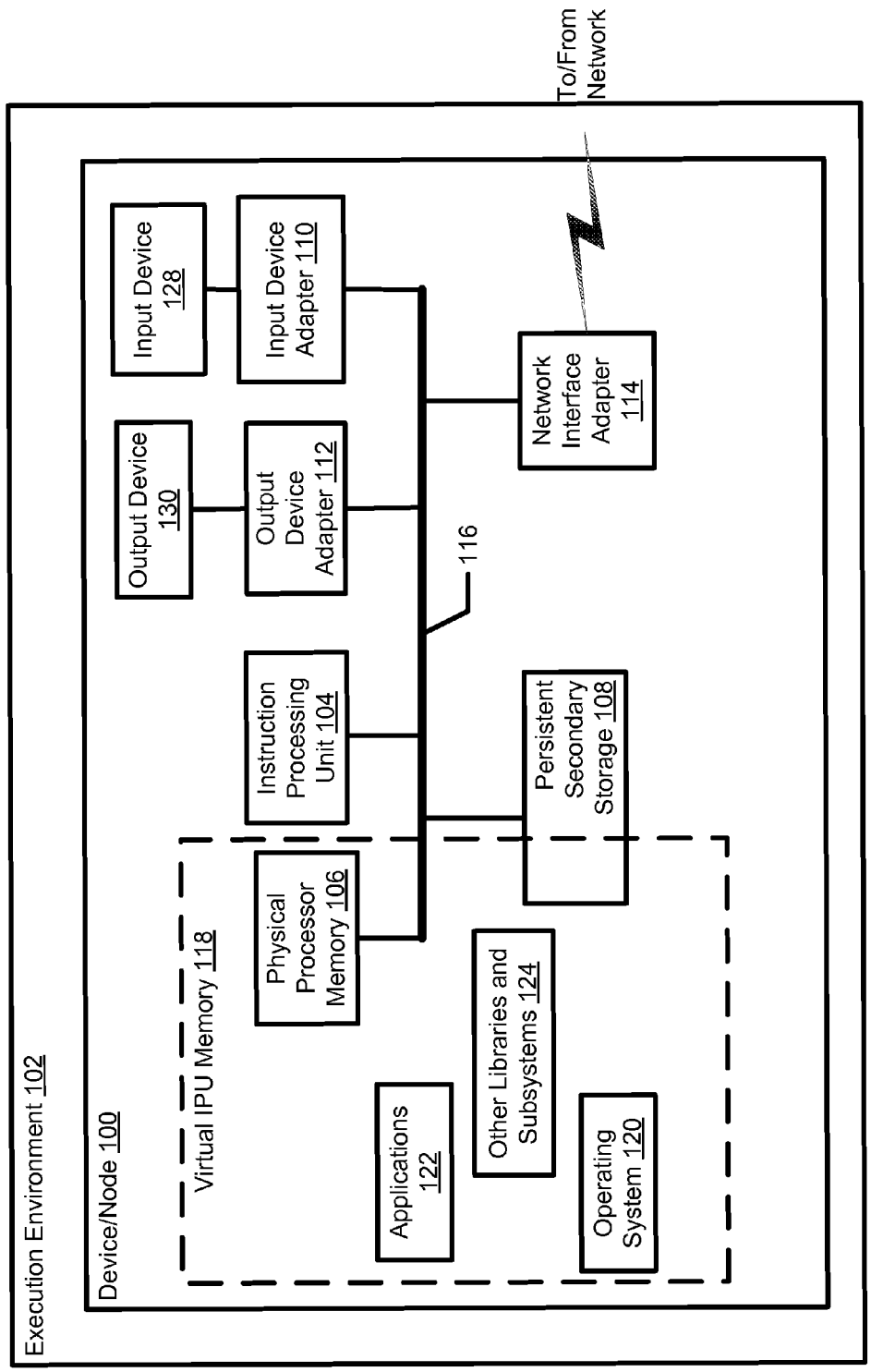
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, hand-held and other mobile devices, multiprocessor devices, distributed devices, consumer electronic devices, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer-readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessed by IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a context referred to as a "process". A process may include one or more "threads". A thread includes a sequence of instructions executed by IPU 104 in a thread context. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network. The terms "device" and "node" as used herein refer to one or more devices and nodes, respectively, providing and/or otherwise included in an execution environment unless clearly indicated otherwise.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The Hypertext Transfer Protocol (HTTP) is specified in "Request for Comments" (RFC) document RFC 2616 by R. Fielding, et al., titled "Hypertext Transfer Protocol—HTTP/1.1" (June 1999). Terms from RFC 2616 are defined below as used herein and are used in describing the subject matter in this document.

The terms "user agent" and "server" refer to roles played by one or more components and/or devices operating in an execution environment. A "user agent" initiates and/or sends a command in a request message. A "server" accepts a command identified in a request message in order to process the command. The terms "server", "service", and "service provider" are used interchangeably herein. Processing a command includes performing and/or otherwise providing for performing the command. The performing of the command may be successful or unsuccessful. As defined and described herein a server may send information, via a response message, to a user agent in response to receiving a command from the user agent, via a request message.

A "request message" as defined herein is a network message that is initiated, send-able, or sent by a node, including a user agent, for receiving by a node including a server. A node or execution environment including a component operating in a user agent role is referred to herein as a "user agent node". A node or execution environment including a component operating in a server role is referred to herein as a "server node". A request message identifies a command for processing by a server operating in a server node. An HTTP request is an exemplary request message. "HTTP request" is defined in section 5 of RFC 2616 along with adaptations and/or extensions described below.

A "response message" is a network message sent as a response to a particular request message sent by a server node to the user agent node that sent the particular "request message". The response message may include a "command response" as a response to a command identified in the particular request message. An "HTTP response" is an example of a "response message" to a particular HTTP request. "HTTP response" is defined in section 6 of RFC 2616 along with adaptations and/or extensions described below.

A "resource" is a data object or service that can be identified by a universal resource identifier (URI). A "message entity" is information transferred as payload of a network message. An "HTTP entity" is information transferred as payload of an HTTP request or an HTTP response. The term "HTTP entity" as used herein is defined as the term "entity" is defined in RFC 2616. An HTTP entity includes meta-information in the form of entity-header fields and content in the form of an entity-body. An "HTTP representation" is an HTTP entity that is subject to content negotiation. The term "HTTP representation" is used herein as the term "representation" is used and defined in RFC 2616.

A command identified in a request message may be processed by a service provider. For example, a service provider may retrieve and/or generate a resource in processing a command. As used herein, a "command response" is a result produced in processing a command from a user agent. The command response is produced to return to the user agent. A command response is returned in a response message.

Figure 2A:
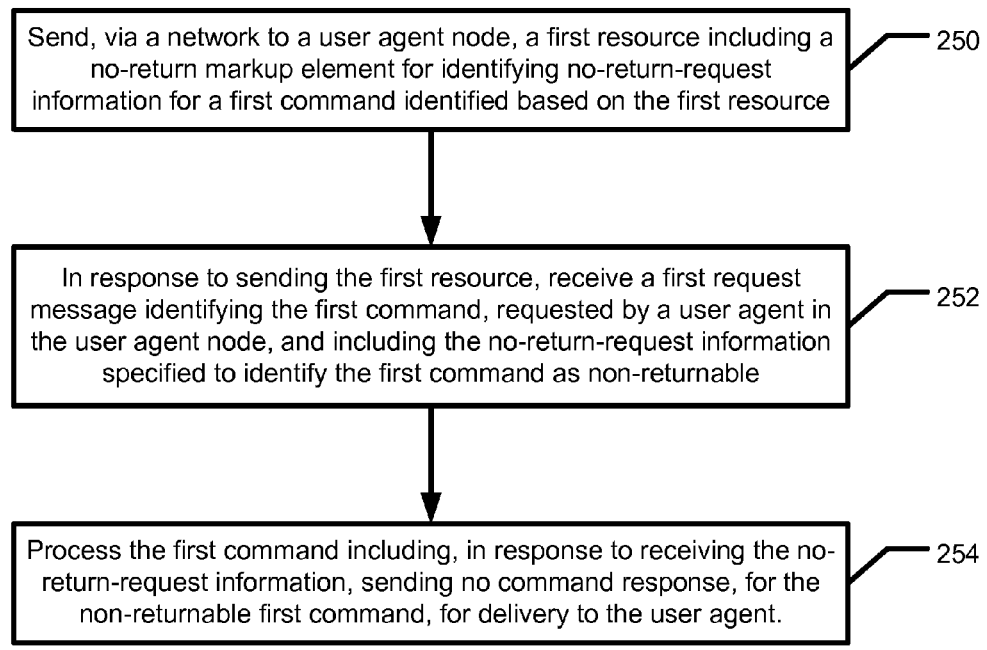
FIG. 2a is a flow diagram illustrating a method for processing a non-returnable command response based on a markup element according to an aspect of the subject matter described herein.
Figure 3A:
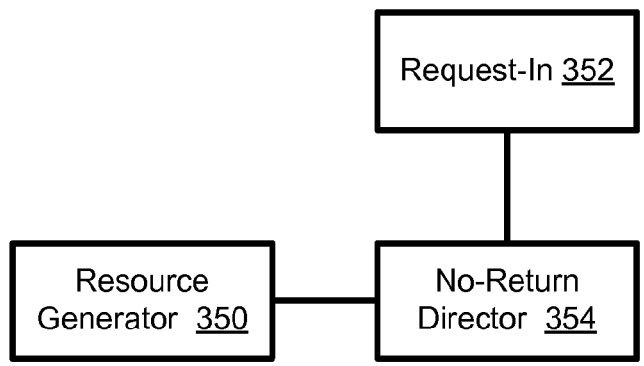
FIG. 3a is a block diagram illustrating an arrangement of components for processing a non-returnable command response based on a markup element according to another aspect of the subject matter described herein.
Figure 5:
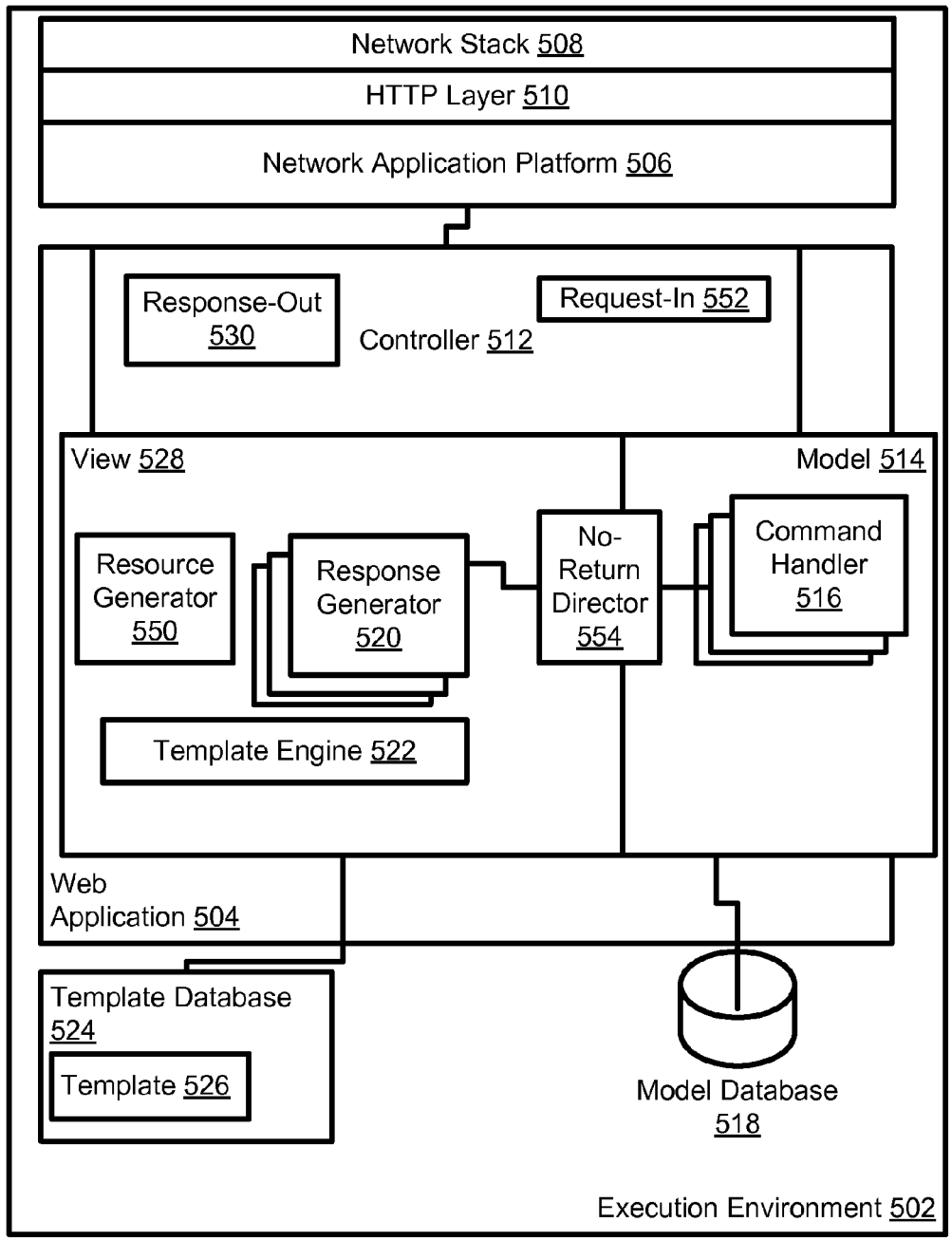
FIG. 5 is a block diagram illustrating an arrangement of components for processing a non-returnable command response based on a markup element according to another aspect of the subject matter described herein.

The block diagram in FIG. 3a illustrates an exemplary system for processing a non-returnable command response based on a markup element according to the method illustrated in FIG. 2a. A system for performing the method illustrated in FIG. 2a includes an execution environment, including an instruction-processing unit, configured to process an instruction included in at least one of a resource generator component 350, a request-in component 352, and a no-return director component 354 illustrated in FIG. 3a. Some or all of the exemplary components illustrated in FIG. 3a may be adapted for performing the method illustrated in FIG. 2a in a number of execution environments. FIG. 5 is a block diagram illustrating the components of FIG. 3a and/or analogs of the components of FIG. 3a adapted for operation in execution environment 502 including or otherwise provided by one or more nodes.

Figure 2B:
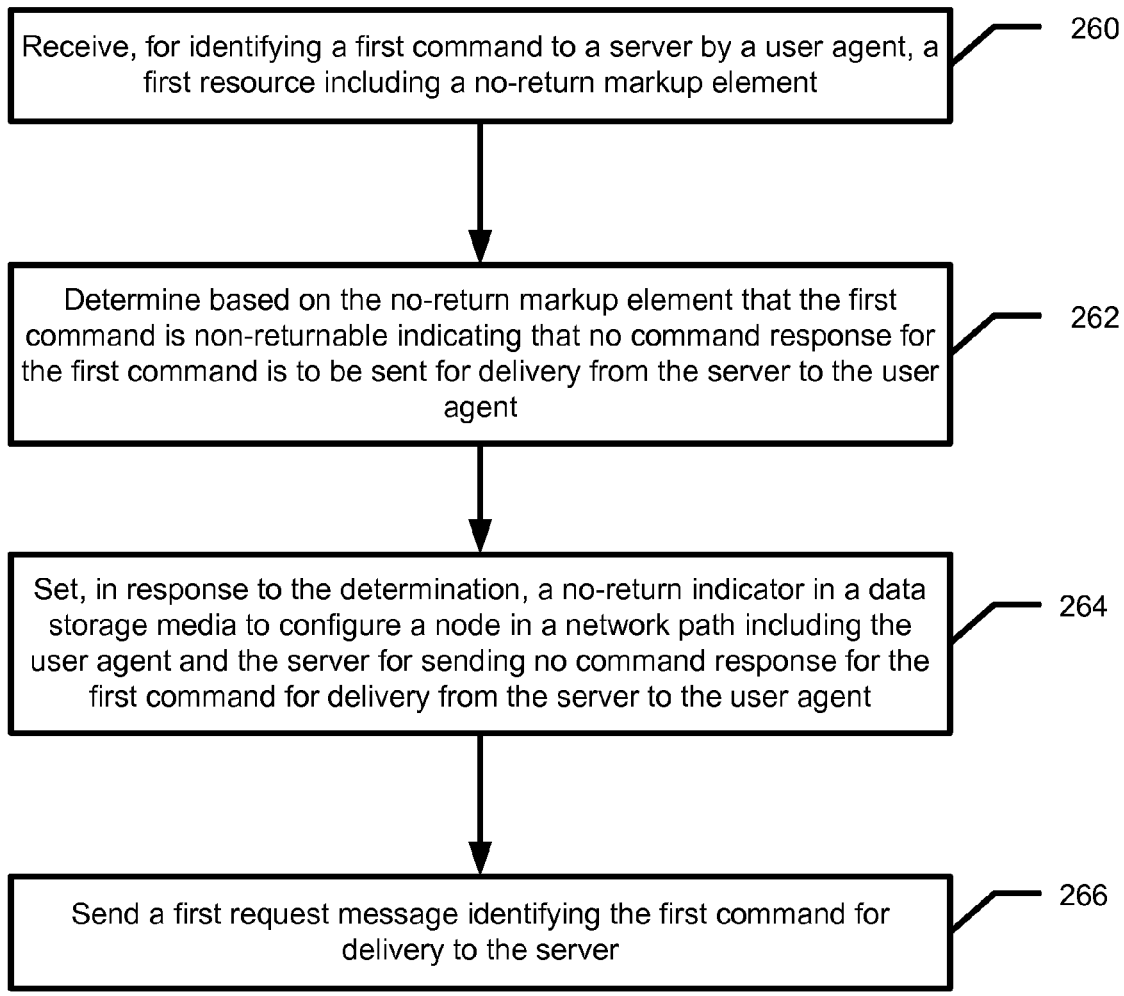
FIG. 2b is a flow diagram illustrating a method for processing a non-returnable command response based on a markup element according to an aspect of the subject matter described herein.
Figure 3B:
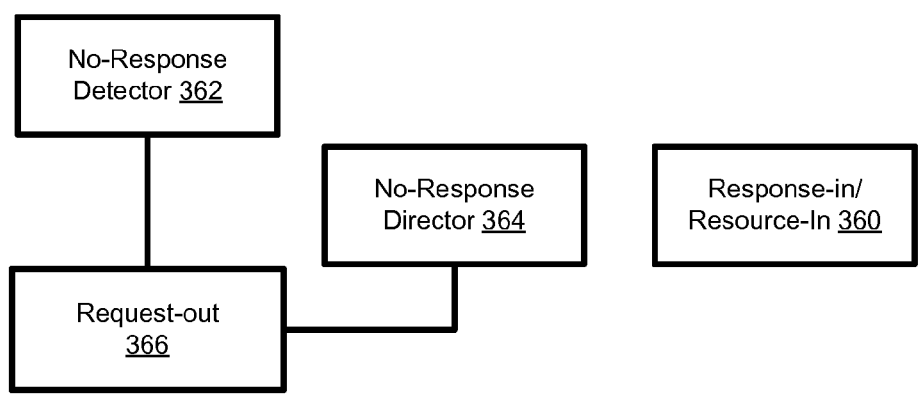
FIG. 3b is a block diagram illustrating an arrangement of components for processing a non-returnable command response based on a markup element according to another aspect of the subject matter described herein.
Figure 4:
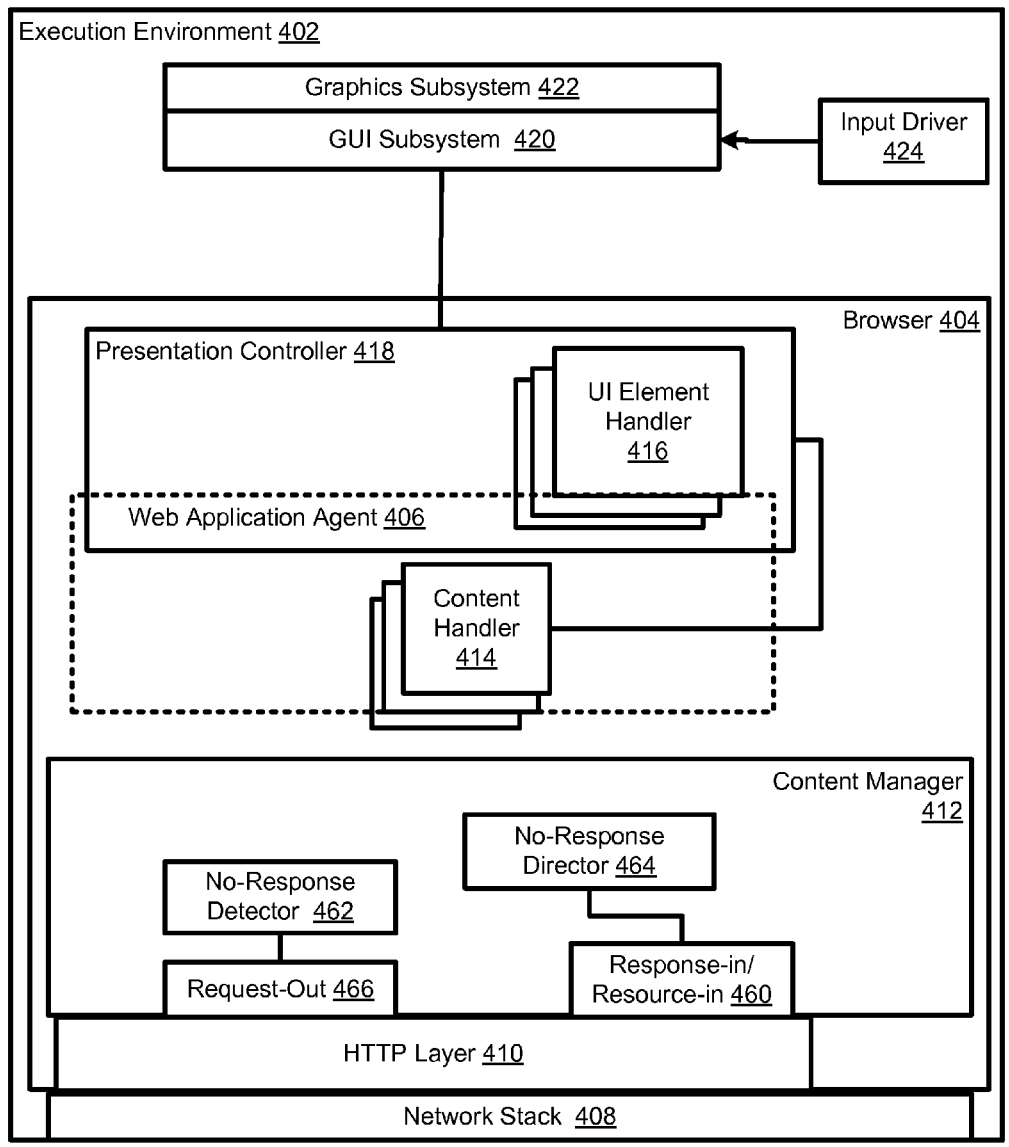
FIG. 4 is a block diagram illustrating an arrangement of components for processing a non-returnable command response based on a markup element according to another aspect of the subject matter described herein.

The block diagram in FIG. 3b illustrates an exemplary system for processing a non-returnable command response based on a markup element according the method illustrated in FIG. 2b. A system for performing the method illustrated in FIG. 2b includes an execution environment, including an instruction-processing unit, configured to process an instruction in at least one of a resource-in component 360, a no-response detector component 362, a no-response director component 364, and a request-out component 366 illustrated in FIG. 3b. Some or all of the exemplary components illustrated in FIG. 3b may be adapted for performing the method illustrated in FIG. 2b in a number of execution environments. FIG. 4 is a block diagram illustrating the components of FIG. 3b and/or analogs of the components of FIG. 3b adapted for operation in execution environment 402 including or otherwise provided by one or more nodes.

FIG. 1 illustrates components of an exemplary device that may at least partially provide and/or otherwise be included in an execution environment. The components illustrated in FIG. 4 and FIG. 5 may be included in or otherwise combined with the components of FIG. 1 to create a variety of arrangements of components according to the subject matter described herein.

Figure 6:
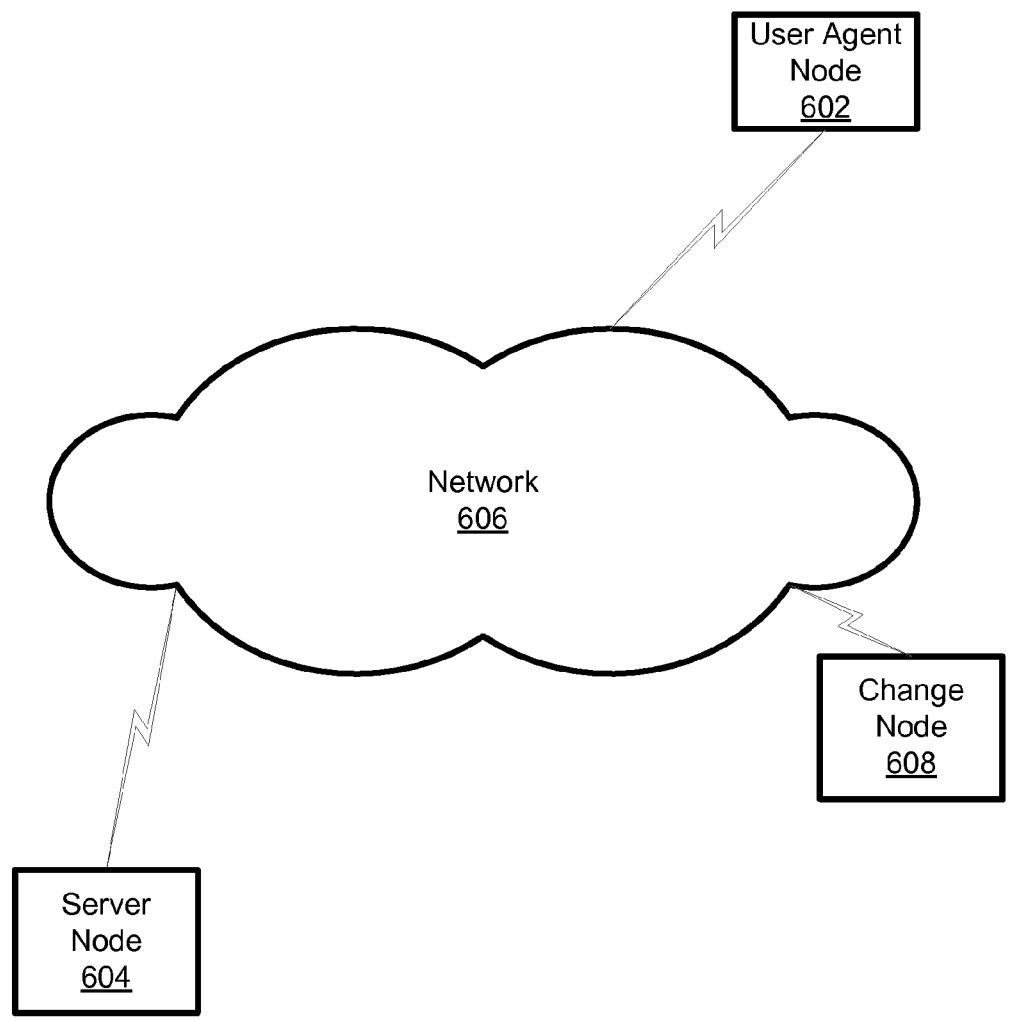
FIG. 6 is a network diagram illustrating an exemplary system for processing a non-returnable command response based on a markup element according to an aspect of the subject matter described herein.

FIG. 6 illustrates user agent node 602 and server node 604 as exemplary devices included in and/or otherwise adapted for providing execution environment 402 and execution environment 502, respectively. As illustrated in FIG. 6, user agent node 602 and server node 604 are operatively coupled to network 606 via respective network interface components enabling user agent node 602 and server node 604 to communicate.

FIG. 4 illustrates execution environment 402 hosting a web browsing application illustrated as browser 404. It is common for a browser and/or a web application agent operating in a browser to operate as user agents. FIG. 4 illustrates browser 404 including an adaptation of the arrangement of components in FIG. 3b. Web application agent 406 is illustrated operating in browser 404 and may be received from a remote application provider, such as web application 504 in FIG. 5. Browser 404 and execution environment 402 may provide at least part of an execution environment for web application agent 406. As defined herein, either or all of browser 404, web application agent 406, HTTP layer 410, and user agent node 602 may operate in the role of user agent and/or include a component operating as a user agent. FIG. 5 illustrates execution environment 502 hosting web application 504, typically operating in the role of a server in a message exchange. FIG.

5 illustrates an adaptation of the arrangement of components in FIG. 3a operating in web application 504.

As stated, the various adaptations of the arrangements in FIG. 3a and in FIG. 3b are not exhaustive. For example, those skilled in the art will see based on the description herein that arrangements of components for performing the methods illustrated in FIG. 2a and FIG. 2b may be distributed across more than one node and/or execution environment. For example, such an arrangement may operate at least partially in browser 404 in FIG. 4 and at least partially in execution environment 502 in FIG. 5.

FIG. 4 illustrates network stack 408 configured for sending and receiving messages over network 606 in FIG. 6, such as the Internet, via a network interface component of user agent node 602. FIG. 5 illustrates a network application platform 506 providing services to one or more web applications. FIG. 5 also illustrates network application platform 506 configured for interoperating with network stack 508. Network stack 408 and network stack 508 may support the same protocol suite, such as TCP/IP, or may communicate via a network gateway or other protocol translation device and/or service. Browser 404 in FIG. 4 and network application platform 506 in FIG. 5 may interoperate via their respective network stacks. Browser 404 and web application 504 may communicate via one or more application layer protocols. FIG. 4 illustrates HTTP layer 410 exemplifying an application layer protocol. FIG. 5 illustrates a compatible HTTP protocol layer as HTTP layer 510.

Browser 404, in FIG. 4, may receive some or all of web application agent 406 as a resource in one more messages sent from web application 504, in FIG. 5, via network application platform 506, network stacks, network interface components, and optionally HTTP layers in the respective execution environments. In FIG. 4, browser 404 includes content manager component 412. Content manager component 412 may interoperate with HTTP layer component 410 and/or network stack 408 to receive the message or messages including some or all of web application agent 406.

Web application agent 406 may include one or more resources, such as a web page or other data representation for presenting a user interface for web application 504. Web application agent 406 may include and/or reference data represented in one or more formats including hypertext markup language (HTML) and/or other markup language, ECMAScript or other scripting language, byte code, image data, audio data, and/or machine code—to name just a few valid presentable data representations depending on the capabilities of a receiving user agent node.

In response to a request message identifying a command received from browser 404, controller component 512, in FIG. 5, may invoke model subsystem 514 to perform command specific processing. Model subsystem 514 may include any number of command processors, illustrated as command handler components 516, for dynamically generating data and/or retrieving data from model database 518 based on the command. Controller component 512 may further invoke one or more response generator components 520 included in generating a command response for the received command, which may include a user interface for presenting to a user of browser 404. The one or more response generator components 520 may invoke template engine component 522 to identify one or more templates and/or other static data to combine with data received from command handler component(s) 516 generated in processing the command. FIG. 5 illustrates template database 524 including an exemplary template 526. The one or more response generator component(s) 520 in view subsystem 528 may interoperate with response-out component 530 in controller component 512 to return the command response generated from processing a command in a response message. The command response may be returned in one or more data formats suitable for a user agent, such as browser 404. Response-out component 530 may receive data from one or more response generator components 520 as one or more message entities, such as an HTTP entity that may include an HTTP representation. Alternatively or additionally, response-out component 530 may transform data from one or more response generator component(s) 520 into one or more message entities. Response-out component 530 may send the one or more message entities in a response message, in response to the request message received from browser 404. Some or all of web application agent 406 may be sent to browser 404 via network application platform 506 in the manner described.

One or more response messages including one or more data representations of some or all of web application agent 406 may be received by content manager component 412 via HTTP layer 410 and network stack 408. In FIG. 4, browser 404 includes one or more content handler components 414 to process data received in message entities, such as HTTP representations, according to their data type. A data type may be identified by a MIME type identifier. Exemplary content handler components 414 include a text/html content handler component for processing HTML representations; an application/xmpp-xml content handler component for processing XMPP streams including presence tuples, instant messages, and publish-subscribe data as defined by various XMPP specifications; one or more video content handler components for processing video representations of various types; and still image data content handler components for processing various image data representations. Content handler component(s) 414 process received HTTP representations and may provide data from the HTTP representations to one or more user interface element handler components 416.

User interface element handler components 416 are illustrated in presentation controller component 418 in FIG. 4. Presentation controller component 418 may manage visual, audio, and other types of output for its including application as well as receive and route detected user and other inputs to components and extensions of its including application, browser 404. With respect to FIG. 4, a user interface element handler component 416 may be adapted to operate at least partially in a content handler component 414 such as a text/html content handler component and/or a script content handler component. Additionally or alternatively, a user interface element handler component in execution environment 402 may operate in web application agent 406 and/or other extension of its including application, such as a plug-in providing a virtual machine for script and/or byte code.

Figure 7:
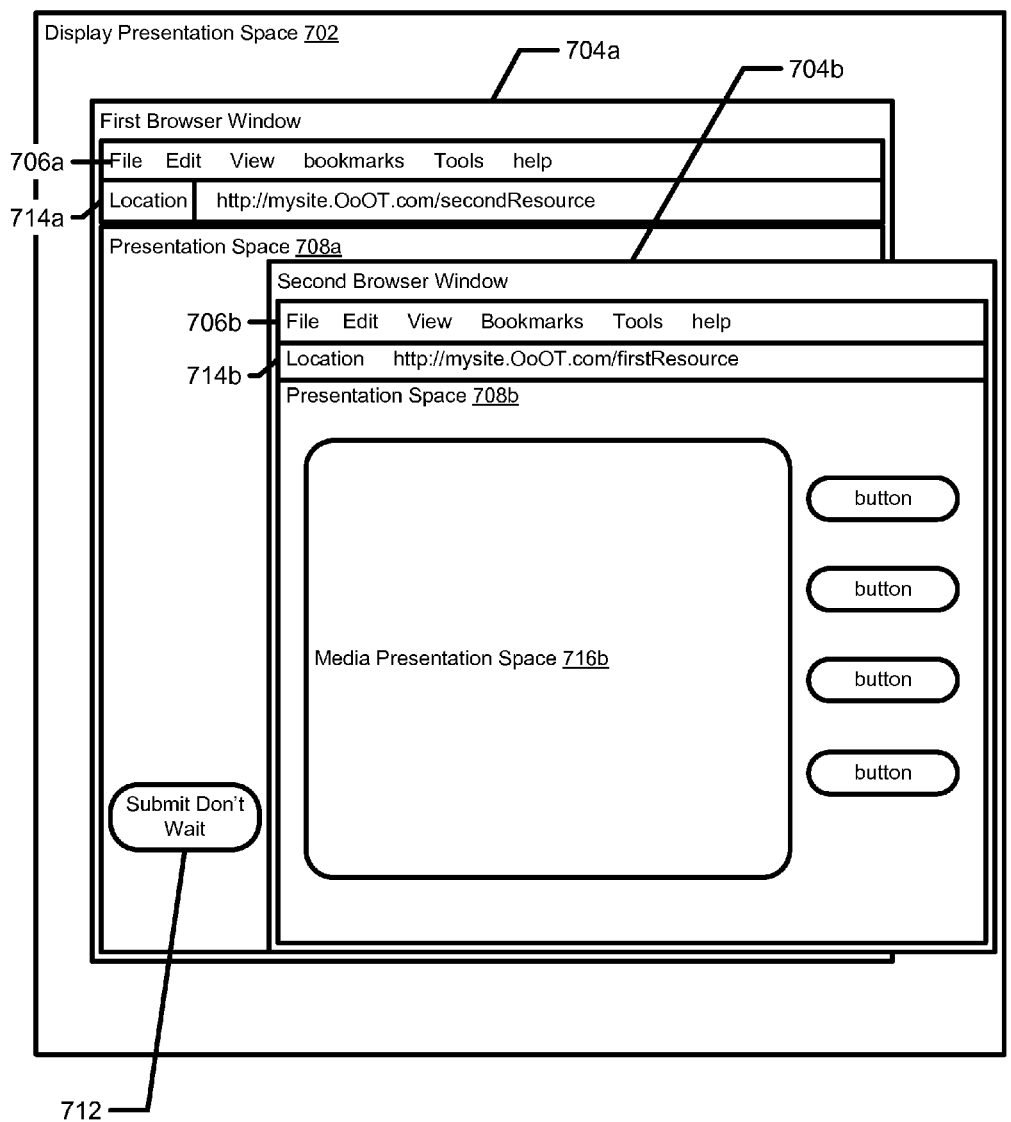
FIG. 7 is a diagram illustrating a user interface presented via a display according to an aspect of the subject matter described herein.

FIG. 7 illustrates a presentation space 702 of a display device, such as output device 130 in FIG. 1, including first browser window 704a of browser 404, web application agent 406, and/or web application 504. FIG. 7 is used to illustrate various exemplary visual components of one or more of browser 404, web application agent 406, and web application 504.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the exemplary elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats including image formats such as JPEG, video formats such as MP4, markup language data such as HTML and other markup based languages, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface elements, audio interface element handler components, tactile interface element handler components, and the like.

A representation of a program entity may be represented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output device adapter device, and/or a storage medium of an output device. A screen of a display, for example, is a presentation space.

As used herein, the terms "program", "program component", "application", "application component", "executable" and "executable component" refer to any data representation that may be translated into a set of machine code instructions and optional associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition includes machine code and virtual machine code, such as Java™ byte code.

Returning to FIG. 7, first browser window 704a and second browser window 704b collectively and generically are referred to as browser window(s) 704. Browser windows 704 illustrate a number of visual user interface elements commonly found in applications. Browser windows 704 include respective menu bars 706 with menu controls for receiving user input to identify commands to perform. Browser windows 704 also include respective user interface elements providing respective presentation spaces 708 for presenting content including other visual components.

Various user interface elements of browser 404, web application agent 406, and/or web application 504 described above may be presented by one or more user interface element handler components 416 and/or response generator components 520. User interface element handler component(s) 416 in FIG. 4 may send presentation information representing a visual interface element(s), such as menu bar 706 illustrated in FIG. 7, to GUI subsystem 420. GUI subsystem 420 may instruct graphics subsystem 422 to draw the visual interface element(s) in a region of display presentation space 702 in FIG. 7, based on the presentation information.

Input may be received via input driver 424 in FIG. 4. For example, a user may move a mouse to move a pointer presented in display presentation space 702 over an operation identifier in menu bar 706. The user may provide an input detected by the mouse. The detected input may be received by GUI subsystem 420 via input driver 424 as an operation or command indicator based on the association of the shared location of the pointer and the operation identifier in display presentation space 702.

With reference to FIG. 2a, block 250 illustrates that the method includes sending, via a network to a user agent node, a first resource including a no-return markup element for identifying no-return-request information for a first command identified based on the first resource. Accordingly, a system for processing a non-returnable command response based on a markup element includes means for sending, via a network to a user agent node, a first resource including a no-return markup element for identifying no-return-request information for a first command identified based on the first resource. For example, as illustrated in FIG. 3a, resource generator component 350 is configured for sending, via a network to a user agent node, a first resource including a no-return markup element for identifying no-return-request information for a first command identified based on the first resource. FIG. 5 illustrates resource generator component 550 as an adaptation of and/or analog of resource generator component 350 in FIG. 3a. One or more resource generator components 550 operate in execution environment 502.

With reference to FIG. 2b, block 260 illustrates that the method includes receiving, for identifying a first command to a server by a user agent, a first resource including a no-return markup element. Accordingly, a system for processing a non-returnable command response based on a markup element includes means for receiving, for identifying a first command to a server by a user agent, a first resource including a no-return markup element. For example, as illustrated in FIG. 3b, the resource-in component 360 is configured for receiving, for identifying a first command to a server by a user agent, a first resource including a no-return markup element. FIG. 4 illustrates resource-in component 460 as an adaptation of and/or analog of resource-in component 360 in FIG. 3b. One or more resource-in components 460 operate in execution environment 402.

Figure 8:
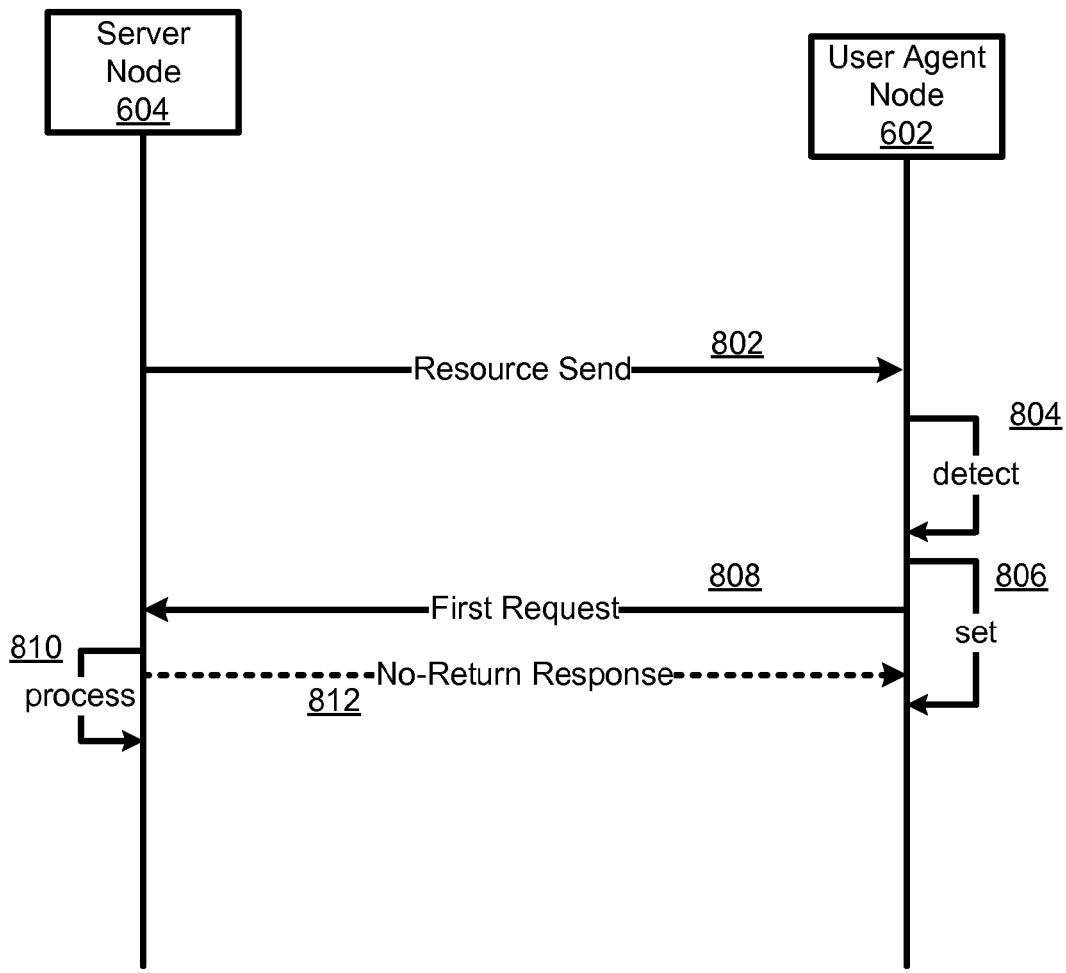
FIG. 8 is a message flow diagram illustrating a message flow in a system for processing a non-returnable command response based on a markup element according to an aspect of the subject matter described herein.

A resource may be sent via a network in a message. FIG. 8 illustrates server node 604 sending a resource in resource send message 802 for receiving by user agent node 602.

Resource send message 802 may be sent in response to a change in the resource detected by server node 604 and/or in response to a request to access the resource. The resource may be sent in response to receiving a message via a network for changing and/or otherwise accessing the resource. The resource may be sent by a server node to a user agent node according to a specified protocol. The protocol specified may include a request/response protocol, a publish-subscribe protocol, and/or an asynchronous protocol specifying a message transmitted asynchronously without a corresponding request or subscription.

When a resource is sent according to a request/response protocol, a request message for the resource may be sent by a user agent node and received by a server node. In accordance with the protocol, the resource may be sent by the server node and received by the user agent node in a response message to the request message. User agent node 602 in FIG. 6 and in FIG. 8 may send a request message to server node 604 to access a resource. In an aspect, HTTP may be the request/response protocol. User agent node 602 may send an HTTP request in a message via network 606 to retrieve the resource. The HTTP request may include an HTTP method token, such as "GET" or "POST", and a URI identifying the resource. The method token and the URI may be included in command information identifying a command for accessing the resource by server node 604 to return the resource in a command response in a HTTP response message to user agent node 602. In a request/response communication, resource send message 802 in FIG. 8 illustrates a response message.

As indicated above, server node 604 in FIG. 6 may include and/or may otherwise be included in execution environment 504 in FIG. 5. Request-in component 552 may receive a command sent in a request message for accessing a resource. The request message may be sent by request-out component 466 in FIG. 4 operating in user agent node 602. For example, request-out component 466 may be invoked in response to presentation controller 418 detecting a selection of a hyperlink presented in a web page for accessing the resource. Request-in component 552 and controller component 512 may invoke a command handler component 516 to process the command. The command handler component 516 may interoperate with resource generator component 550 to transform the result produced by the command handler component 516 into a representation of the resource that is suitable for browser 404. Resource generator component 550 may be a particular response generator component 520 associated with the command identified in the request message. Resource generator component 550 may interoperate with response-out component 530 to send resource send message 802 including the resource as a command response to the command. Response-in/Resource-in component 460 may receive the resource sent in resource send message 802 and process the resource. For example, the resource may include and/or may be included in web application agent 406.

In another aspect, a resource may be sent in a notification message, in response to receiving a resource change message including change information for creating and/or otherwise changing the resource. The resource change message may be sent by user agent node 602 or another node in network 606, such as change node 608. The resource change message may be a publish message including change information for updating the resource according to a publish-subscribe protocol. In response, to receiving the change information, server node 604 may send resource send message 802 as a notification message to user agent node 602 according to the publish-subscribe protocol. User agent node 602 may receive resource send message 802 based on a subscription to the resource or may receive the resource send message 802 as a directed-notify message without having a subscription for resource notification messages. A directed-notify message is an asynchronous message.

In still another aspect, a resource may be sent in response to an event other than receiving a message via a network. A server node may receive and/or otherwise detect change information indicating a change to a resource. In response to the change information, the resource may be sent asynchronously according to an asynchronous protocol. For example, server node 604 may detect a change to a resource via a system administrator through a user interface provided by server node 604. Change information may be received via the user interface indicating a change to the resource. Server node 604 may send the resource asynchronously in resource send message 802 in FIG. 8, for example as an event message received by user agent node 602.

Web application 504 and/or an analog may be adapted to receive a resource change message such as publish message via a publish-in component (not shown) for receiving resource change information according to a particular publish-subscribe protocol. A notification-out component (not shown) and subscription handler component (not shown) may be included in web application 504 and/or an analog for sending notification messages and processing subscription messages, respectively. Analogously, browser 404 operating in execution environment 402 including and/or included in user agent node 602 may be configured to send/and receive messages via a request/response protocol, a publish-subscribe protocol, and/or to receive an asynchronous message for receiving a resource from server node 604.

A resource may include a no-return markup element, described in more detail below. The resource may include presentation information for presenting a user detectable representation of at least a portion of the resource via an output device. The no-return markup element may include and/or may be included in some or all of the presentation information. For example, the resource may include a web page including HTML markup elements and/or other markup, one or more script instructions, and/or one or more media representations such as an image, a video, and/or or audio data. One or more of the user interface elements may be presented in a presentation space. Presentation space 708*a* in FIG. 7 may include UI elements representing markup elements in the resource. Submit-don't-wait UI element 712*a* illustrates a representation of a markup element including and/or included in a no-return markup element. A markup element for submit-don't-wait UI element 712*a* may identify a command to perform in response to an event detected corresponding to submit-don't-wait UI element 712*a*. A no-return markup element may be defined in a markup language for preventing a user agent from receiving a command response for a command and/or may be a markup element processed by a program component, such as script, for preventing a user agent from receiving a command response for a command.

A no-return markup element may be associated with any markup element defined for sending a command to a server. For example, a no-return markup element may be included in and/or may include a hyperlink markup element, a form markup element, and/or an event markup element. The command may be identified based on the hyperlink markup element, the form markup element, and/or the event markup element.

Figure 9A:
FIG. 9a illustrates markup information including an exemplary markup element according to the subject matter described herein.
Figure 9B:
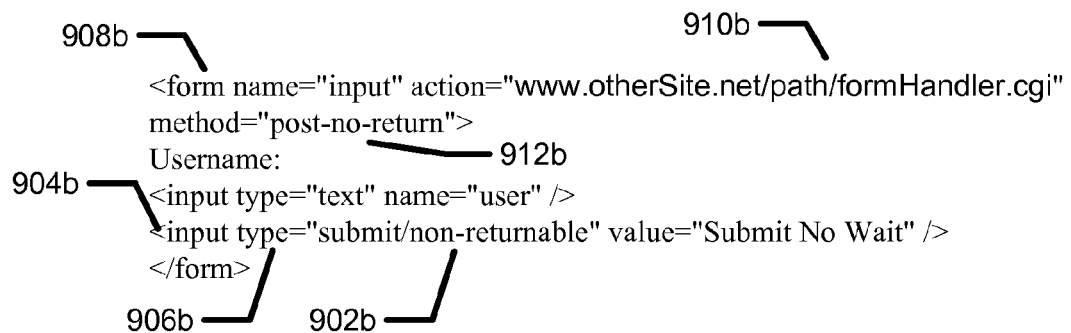
FIG. 9b illustrates markup information including an exemplary markup element according to the subject matter described herein.

FIG. 9*a*, FIG. 9*b*, FIG. 9*c*, and FIG. 9*d* illustrate various resources and/or portions of resources including a no-return markup element according to various aspects of the subject matter described herein. FIG. 9*a* illustrates no-return markup element 902a as an attribute in hyperlink markup element 904a illustrated as a hypertext markup language (HTML) anchor tag "<a>". FIG. 9b illustrates no-return markup element 902b as an attribute value "submit/non-returnable" in <input> tag element 904b as a value for a type attribute 906b. <input> tag 904b is included in a <form> markup element 908b. In the value "submit/non-returnable", the portion, "non-returnable", may identify a subtype of the "submit" input type. In FIG. 7, submit-don't-wait UI element 712a may be a visual representation based on input tag 904b. FIG. 9c illustrates no-return markup element 902c as parameter to an "onblur" event attribute 904c in an HTML <input> tag 906c in <form> tag 908c. FIG. 9d illustrates no-return markup element 902d as <no-return> tag 902d. No-return markup element 902d illustrates a parent markup tag including a form tag 904d, which includes a number of descendent markup elements defined by the nested structure of the markup language. As a parent tag, no-return markup element 902d may be defined to indicate that commands identified by descendent markup elements are non-returnable commands.

While FIG. 9a, FIG. 9b, FIG. 9c, and FIG. 9d illustrate no-return markup elements included in HTML markup, no-return markup elements may be defined according to other markup languages including SOAP, resource description framework (RDF), Apache ANT, and standard general markup language (SGML), to name a few examples.

FIG. 4 illustrates resource-in component 460 operating in content manager 412 for receiving, from web application 504 in FIG. 5, a resource including a no-return markup element and command information for identifying a command. Content manager 412 may provide the resource and/or various portions of the resource to one or more content handler components 414 based on the type of data included in the resource and/or the portions. The one or more content handler components 414 may interoperate with presentation controller component 418 to invoke one or more UI element handler components 416 to present a user detectable presentation of some or all of the resource via one or more output devices. Web application agent 406 may illustrate the resource, in an aspect.

In sending a resource from a server node to a user agent node, a user application, a service provider application, a proxy service, a server node, and a user agent node, a web browser, a web server, a web application, and/or a web application platform may operate as either or both a user agent and a server.

Returning to FIG. 2b, block 262 illustrates that the method further includes determining based on the no-return markup element that the first command is non-returnable indicating that no command response for the first command is to be sent for delivery from the server to the user agent. Accordingly, a system for processing a non-returnable command response based on a markup element includes means for determining based on the no-return markup element that the first command is non-returnable indicating that no command response for the first command is to be sent for delivery from the server to the user agent. For example, as illustrated in FIG. 3b, the no-response detector component 362 is configured for determining based on the no-return markup element that the first command is non-returnable indicating that no command response for the first command is to be sent for delivery from the server to the user agent.

FIG. 8 illustrates detect message 804 communicated within user agent node 602 for determining whether a command is non-returnable. A command may be identified based on a resource based on an instruction in the resource and/or a markup element in the resource. The command may be determined to be non-returnable based on a user input detected corresponding to a representation of the command in a presentation of at least a portion of the resource presented via an output device. The command may be determined to be non-returnable based on an instruction, in the first resource, executed to identify the first command. The command may be determined to be non-returnable based on a markup element, in the first resource, processed to identify the first command. These options are not mutually exclusive.

In FIG. 4, web application agent 406 may be sent by web application 504 to browser 404. Web application agent 406 may include HTML markup information and/or one or more script instructions. A content-handler component 414, presentation controller 418, and a UI element-handler 416 may be included in and/or otherwise interoperate with a user agent, such as web application agent 406. In another aspect, an adaptation of the arrangement of components in FIG. 3a may operate in HTTP layer component 410. In the aspect, browser 404 and/or web application agent 406 may be user agents to HTTP layer component 410. In yet another aspect, execution environment 402, including user agent node 602, may identify a command based on the resource in a request message to a relay node, such as proxy server, in network 606 in a network path between user agent node 602 and server node 604. An adaptation of the arrangement of components in FIG. 3a may operate in an execution environment including and/or otherwise provided by the relay node. In the aspect, user agent node 602 may play the role of user agent according to the method illustrated in FIG. 2a.

Returning to FIG. 4, web application agent 406 may include a script instruction associated with a markup element. The script instruction may identify a command based on the markup element to web application 504. The command may be sent to provide information to web application 504 concerning web application agent's 406 state. Web application 504 may receive many such messages based on repeated execution of the script including the instruction. A missed message may be insignificant in the operation of the resource and web application 504, so a command response may be unnecessary or even inefficient to process.

In response to a request and/or instruction to send a command to a server, FIG. 4 illustrates request-out component 466 may be invoked by a content handler component 414 for the HTML and/or a content handler component 414 for a script instruction to send a request message identifying the command to web application 504 in server node 604. Request-out component 460 may interoperate with one or more components in processing the invocation. No-response detector 462 may be invoked to process information based on the no-return markup element in the resource identifying the command to determine that the command is non-returnable. In other adaptations, a no-response detector 462 or an analog may be invoked, for example, prior to, during, and/or after an invocation of request-out component 466 to send first request message 808 in FIG. 8. In still other adaptations, a no-response detector may operate in an HTTP layer component, a network stack component, in a server node, and/or a node in a network path between a server node and a user agent node to prevent a command response from web application 504 from being sent for delivery to a user agent requesting a command.

Returning to FIG. 2b, block 264 illustrates that the method yet further includes setting, in response to the determination, a no-return indicator in a data storage medium to configure a node in a network path including the user agent and the server for sending no command response for the first command for delivery from the server to the user agent. Accordingly, a system for processing a non-returnable command response based on a markup element includes means for setting, in response to the determination, a no-return indicator in a data storage medium to configure a node in a network path including the user agent and the server for sending no command response for the first command for delivery from the server to the user agent. For example, as illustrated in FIG. 3b, no-response director component 364 is configured for setting, in response to the determination, a no-return indicator in a data storage medium to configure a node in a network path including the user agent and the server for sending no command response for the first command for delivery from the server to the user agent. FIG. 4 illustrates no-response director component 466 as an adaptation of and/or analog of no-response director component 364 in FIG. 3b. One or more no-response director components 466 operate in execution environment 402.

FIG. 8 illustrates set message 806 communicated within user agent node 602 for setting a no-return indicator in a data storage medium to send no command response from the server for delivery to the user agent for the command identified based on the resource received in resource send message 802.

In an aspect, setting a no-return indicator may include unsetting and/or otherwise not setting a return indicator for sending a command response for a command from a server for delivery to a user agent. In FIG. 4, no-response detector component 462 may invoke no-response director 464 in response to determining that a command is non-returnable. No-response director 464 may reset, unset, and/or otherwise not set a return location in a processor memory and/or secondary storage that when set indicates a command response is deliverable to a requesting user agent. The return location may be a location in processor memory for a return flag for detecting a command response received from web application 504. Alternatively or additionally, the return location may be a location in a request message, such as first request message 808 in FIG. 8. The return location in the request message may be configured when set for indicating to web application 504 that a command response is requested for the command identified by the request message.

In another aspect, setting a no-return indicator may include storing, based on a received no-return markup element, storing the no-return indicator in a no-return location data storage medium, such as a processor memory and/or a hard-drive for accessing in response to receiving a response message. Setting the storage indicator may include providing and/or otherwise generating no-return-request information based on the no-return markup element for including in a request message identifying a non-returnable command. No-return-request information may be stored in a no-return location in first request message 808 in FIG. 8, for sending to web application 504 in server node 604. The no-return location in request message 808 may be configured for indicating to web application 504 and/or to no-response director 464 no command response from web application 504 is to be sent for delivery to the user agent that identified the command, such as web application agent 406. No-response director component 464 may interoperate with request-out component 466 to store the no-return indicator in a variable in a data storage medium in execution environment 402 and/or to store no-return-request information in first request message 808.

One or more no-return locations in execution environment 402 and/or in first request message 808 may be allocated for setting a no-return indicator. A no-return indicator may be processed by one or both of user agent node 602 and server node 604.

In another aspect, no-return-request information may be received and/or otherwise identified in some or all of a request message for sending command information to a server. In FIG. 4, a request message or a partial request message may be provided to HTTP layer 410 including an adaptation of the arrangement of components in FIG. 3a, and/or content-manager component 412 may provide some or all of the request message to request-out component 466.

FIG. 10 illustrates HTTP request 1000 including no-respond HTTP header 1010 included in no-return-request information generated based on a no-return markup element. No-return-request information may be included and/or otherwise may be based on an HTTP method token, a URI, an HTTP message line, an HTTP general header, an HTTP message header, an HTTP entity, and an HTTP representation. HTTP request 1000 is discussed in further detail below. Some or all of a no-return indicator and/or no-return-request information may be included in command information received for sending a request message. For example, a URI scheme, scheme modifier, and/or attribute of a URI may indicate a command is to be sent in an HTTP request.

A no-return indicator and/or no-return-request information may be specific to a particular command or command type, a user of a user agent, a web application, a type of web application, a network address of a server node, a location of a server node, a security attribute associated with a user, and the like.

A request message may include an HTTP request and a command may be identified based on an HTTP method token, a URI, an HTTP request line, an HTTP general header, an HTTP request header, an HTTP entity, and/or an HTTP representation as described above. No-return-request information may include and/or otherwise be based on a MIME type identifier and/or a request message method token, such as HTTP method token. A MIME type identifier included in no-return-request information may be defined to identify a content type including no command response for delivering to a user agent. A MIME type identifier defined as such may be associated with an HTTP representation in an HTTP entity. The HTTP entity and/or an HTTP representation may be identified by the MIME type identifier as empty and/or otherwise including no command response for a user agent.

FIG. 11a illustrates empty/* MIME type 1108a stored in a location in Accept header 1110a in HTTP request 1100a. Empty/* MIME type 1108a may be sent in HTTP request 1100a in first request message 808 to instruct server node 604 to send no command response for delivering to a user agent that requested processing of the first command identified by HTTP request 1100a. In one aspect, no-return-request information may be specified for indicating that no command response for the first command is to be generated by the server. Alternatively or additionally, no-return-request information may be specified for indicating that no response message is to be transmitted for the server node in response to request message.

Alternatively or additionally, a no-return indicator and/or no-return-request information may include and/or otherwise identify an HTTP method token defined to indicate that no HTTP response including a command response to a corresponding command is to be sent from a server for delivery to a requesting user agent. An HTTP method token may further indicate that no command response is to be generated by the server. Still further, an HTTP method token may be defined to identify the HTTP request as a no-return message having no corresponding HTTP response. The "POST-NO-RETURN" HTTP method token described above may be defined according to one or more of the aspects described in this paragraph and described in further details below.

Returning to FIG. 2b, block 266 illustrates that the method yet further includes sending a first request message identifying the first command for delivery to the server. Accordingly, a system for processing a non-returnable command response based on a markup element includes means for sending a first request message identifying the first command for delivery to the server. For example, as illustrated in FIG. 3b, request-out component 366 is configured for setting, in response to the determination, a no-return indicator in a data storage medium to configure a node in a network path including the user agent and the server for sending no command response for the first command for delivery from the server to the user agent. FIG. 4 illustrates request-out component 466 as an adaptation of and/or analog of request-out component 366 in FIG. 3b. One or more no-response director components 466 operate in execution environment 402.

Any of the exemplary markup information illustrated in FIG. 9a, FIG. 9b, FIG. 9c, and FIG. 9d may be processed by a compatible content handler component 414, such as markup content handler 460. Markup content handler component 460 may interoperate with one or more UI element handler components 416 to present a user detectable representation of the markup information to a user via an output device. For example, the received resource may include the markup illustrated in FIG. 9a to present a selectable link in presentation space 708a of first browser window 704a or to present some other a selectable input control, such as submit-don't-wait UI element 712. FIG. 4 illustrates that a user input may be received by presentation controller component 418 and/or a UI element handler 416 corresponding to the link or to submit-don't-wait UI element 712 in representing a portion of web application agent 406 received from web application 504 in server node 604. Hyperlink markup element 904a in FIG. 9a identifies a command associated with presentable link. The <input> tag 904b in FIG. 9b identifies a command associated with a form submit UI element, which may be submit-don't-wait UI element 712 in FIG. 7.

A command, such as the first command identified in first request message 808 in FIG. 8 may be identified by command information included in the request message based on a no-return markup element, and/or a markup element including and/or included in a no-return markup element. FIG. 9a, FIG. 9b, FIG. 9c, and FIG. 9d illustrate that a command may be identified by at least one of the hyperlink markup element, the form markup element, and the event markup element. In FIG. 9a, an "href" attribute value 906a may be included in command information identifying a command in a request message. In FIG. 9b, action attribute value 910b, method value 912b, and data included in one or more input tags may be included in command information and/or otherwise included in generating command information.

An event markup element may identify an event to be detected by the user agent node for sending a request message for receiving by a server node. The event may be based on and/or may be detected based on a user input, a specified time, a specified duration of time, a specified condition when met, and on execution of an instruction sent from the server node to the user agent node. Hyperlink markup element 904a in FIG. 9a identifies a selection input event for sending a request message. Form tag 908b in FIG. 9b and form tag 904d in FIG. 9d identify respective submit events for submitting form information. <input> tag 906c in FIG. 9c identifies "onblur" event attribute 904c. FIG. 9d illustrates responsemax attribute 908d specifying a duration of time for determining whether a command has a non-returnable command response.

As illustrated by no-return tag 902d in FIG. 9, a no-return markup element may be a parent markup language. FIG. 9c illustrates that a no-return markup element may be included in a parent markup element. A parent markup element may include multiple child markup elements. More than one child element may identify a command that may be identified in a request message. The no-return markup element may be defined for and/or otherwise may indicate that a command in each of the more than one child elements has a corresponding non-returnable command response. Alternatively or additionally, the no-return markup element may be defined for determining that one or more request messages including a command identified in the parent markup element and/or a child element of the parent have non-returnable command responses.

In response to a user input for selecting the link presented in presentation space 708a in FIG. 7 or in response to detecting some other event, event information may be received by presentation controller component 418 and/or a UI element handler 416. In an aspect, presentation controller component 418 and/or the UI element handler component 416 may interoperate with a markup content handler component 460 to match the event with the command information stored in a document object model (DOM) maintained by the markup content handler component 414 and generated based on the markup information included in the received resource.

The markup content handler component 460 may interoperate with content manager component 412 to generate command information to send in a request message to web application 504 in FIG. 5 operating in server node 604 in FIG. 6. Server node 604 may be identified by the URI in hyperlink markup element 904a in FIG. 9a. The request message may be sent as described above. For example, the request message may be sent as an HTTP request. First request message 808 may be sent in this manner and/or in an analogous manner according to another suitable protocol.

HTTP request 1000 may be sent by request-out component 466 in FIG. 4 in first request message 808 from user agent node 602 to server node 604. FIG. 10 illustrates HTTP request 1000 including first command information identifying a first command. The first command information in HTTP request 1000 includes first URI 1002 illustrated as www.otherSite.net/path/formHandler.cgi identifying a command for processing form data 1004 by web application 504. Form data 1004 is illustrated as an HTTP representation encoded according to MIME type "application/x-www-form-urlencoded". A user agent may have no need for a response, may operate in a changing environment where a response will arrive too late to matter, and/or may be providing information to a server node. First command information in HTTP request 1000 may also include an HTTP method token 1006 illustrated as "POST". Additional data included in the first command information may be included in an HTTP header. For example, cookie header 1008 identifies a session identifier illustrated by a "sessionid" cookie. A server node may identify a command or an aspect of a command based on a value of a cookie and/or other HTTP header information. Server node 604 may be identified by a host portion of URI 1002, "www.otherSite.net". HTTP request 1000 illustrates command information identifying a command may include information in one or more of URI 1002, form data 1004, HTTP method token 1006, and cookie header 1008.

HTTP request 1000 in FIG. 10 may be sent in first request message 808. FIG. 10 illustrates the value "true" stored in a location in no-respond header 1010. No-respond header 1010 may be included in no-return-request information. No-respond header 1010 may be defined so that, in an aspect, the value "true" may be sent in HTTP request 1000 in first request message 808 to send no command response for the command identified by HTTP request 1000 for delivery to a user agent that sent the command, such as web application agent 406. The markup content handler component 460 and/or content manager component 412 may include no-respond header 1010 in first HTTP request 1000 based on no-return markup element 902a in FIG. 9a.

HTTP request 1000 may be generated by browser 404 in response to receiving the resource from server node 604. The resource may include markup illustrated in FIG. 9a including no-return markup element 902a. The markup in FIG. 9a may be received by browser 404 in the resource received in resource send message 802 in FIG. 8. HTTP request 1000 may be sent by request-out component 466 as instructed by content manager 412 to HTTP layer 410. HTTP layer 410 may send the request message illustrated by first request message 808 in FIG. 8 to server node 604.

FIG. 11a and FIG. 11b illustrate an exemplary request message and response message pair exchanged in an HTTP communication between browser 404 operating in user agent node 602 and web application 504 operating in server node 604. FIG. 11a illustrates HTTP request 1100a. HTTP request 1100a includes URI 1102a illustrated as www.mySite.us/services/log?eventType=onblur identifying a logging service for logging browser events for a specified session. HTTP request 1100a also includes HTTP method token 1104a illustrated as "POST". First URI 1102a includes a query portion identifying a keyword value pair as "eventType=onblur". In FIG. 11a, the query portion is included in the command information. Server node 604 may be identified by a host portion of first URI 1102a, www.otherSite.net. The identified command requests a logging service in a server node identified in first URI to log an onblur event for a session identified by cookie header 1106a. Command information identifying the first command in HTTP request 1100a may include information in one or more or first URI 1102a, HTTP method token 1104a, and cookie header 1106a.

HTTP request 1100a may be generated by browser 404 in response to receiving a resource from server node 604. The resource may include markup illustrated in FIG. 9c including no-return markup element 902c illustrated as a string, "non-returnable", in a value of an "onblur" event attribute in <input> tag 906b. Whenever a representation of the input element presented on a display device loses input focus, a script "log( )" routine is invoked with the "non-returnable" value passed as a parameter. The markup in FIG. 9c may be received by browser 404 in the resource received in resource send message 802 in FIG. 8. In processing, an onblur event, browser 404 may generate HTTP request 1100a, for example, to send first request message 808 in FIG. 8 to server node 604. In addition to including the command information described above, HTTP request 1100a may include no-return-request information illustrated in FIG. 11a by MIME type identifier 1108a.

Command information as well as no-return-request information, if any, may be provided to and/or generated by content manager 412 to generate a request message including the command information, to identify a command for performing by a server. Command information may further include a method token, such as an HTTP method token in an HTTP request. An HTTP method token may be provided by browser 404 and/or web application agent 406. Content manager 412 in FIG. 4, operating in user agent node 602, may interoperate with HTTP layer 410 to send the first command information in first request message 808 to server node 604 via network 606. Server node 604 may be identified and located in network 606 by the first URI. First request message 808 may include HTTP request 1000 or HTTP request 1100a including no-return-request information based on, for example, no-return markup element 902a in FIG. 9a.

Returning to FIG. 2a, block 252 illustrates that the method yet further includes, in response to sending the first resource, receiving a first request message identifying the first command, requested by a user agent in the user agent node, and including the no-return-request information specified to identify the first command as non-returnable. Accordingly, a system for processing a non-returnable command response based on a markup element includes means for, in response to sending the first resource, receiving a first request message identifying the first command, requested by a user agent in the user agent node, and including the no-return-request information specified to identify the first command as non-returnable. For example, as illustrated in FIG. 3a, request-in component 352 is configured for, in response to sending the first resource, receiving a first request message identifying the first command, requested by a user agent in the user agent node, and including the no-return-request information specified to identify the first command as non-returnable. FIG. 5 illustrates request-in component 552 as an adaptation of and/or analog of request-in component 352 in FIG. 3a. One or more request-in components 552 operate in execution environment 502.

Request-in component 552 in FIG. 5, may receive a request message such as first request message 808 in FIG. 8 and/or second request message 808 from user agent node 602 via network stack 508, HTTP layer 510, and network application platform 506 as described above. Request-in component 552 may receive some or all information in a request message by interoperating with network application platform 506. Request-in component 552 may identify a command received in a request message, such as the first command in first request message 808. Request-in component 552 may interoperate with one or more components in controller component 512 to identify a command handler component 516 to perform an operation included in processing the command.

Web application agent 406 and/or browser 404, operating in the role of user agent, may include and/or may process no-return markup element and command information in a markup tag and/or instruction for identifying a command. In response, to a user input, execution of the instruction, and/or processing of the markup element, browser 404 operating in user agent node 602 may send second command information identifying a command in a second request message (not shown), in addition first request message 808 in FIG. 8. Server node 604 may receive the second command information via the second message with at least a portion of web application operating in a server role. An adaptation and/or analog of the arrangement of components in FIG. 3a operating in HTTP layer 510, operating in network stack 508, and/or operating in web application as illustrated in FIG. 5, may determine the second command is returnable.

In FIG. 5, no-return director component 554 may determine the second command is returnable based on an absence of no-return-request information in the second message request and/or based on an indicator requesting a command response. In response to determining the second command is returnable, no-return director 554 may instruct a response generator component 520 to process result information from a command handler component 516 identified to process the second command. The response generator component 520 may transform and/or otherwise generate command response information for sending a command response for the second command. No-return director 554 may interoperate with response-out component 530 and/or the response generator component 520 to include the command response in a second response message for the second request message. Response-out component 530 may send the second response message via network 606 to user agent node 602 for delivering the second command response to the user agent (either web application agent 406 and/or browser 404). Web application may perform some or all of the processing of the second command including generating the second command response while processing the first command identified in first request message 808. The second response message includes no command response for delivery to a user agent that requested processing of the first command.

In user agent node 602, response-in component 460 and/or an analog in HTTP layer 410 may receive the second command response in the second response message. Response-in component 460 and/or the analog may send the command response to a component for delivering to a user agent and/or send the second command response to a component operating in the role of a user agent from the perspective of response-in component 460 and/or the analog in HTTP layer 410.

The second command may be sent by the user agent and/or received by the server before, during, and/or after the first command is respectively sent by the user agent and received by the server.

Returning to FIG. 2a, block 254 illustrates that the method additionally includes processing the first command including, in response to receiving the no-return-request information, sending no command response, for the non-returnable first command, for delivery to the user agent. Accordingly, a system for processing a non-returnable command response based on a markup element includes means for processing the first command including, in response to receiving the no-return-request information, sending no command response, for the non-returnable first command, for delivery to the user agent. For example, as illustrated in FIG. 3a, no-return director component 354 is configured for processing the first command including, in response to receiving the no-return-request information, sending no command response, for the non-returnable first command, for delivery to the user agent. FIG. 5 illustrates no-return director component 554 as an adaptation of and/or analog of no-return director component 554 in FIG. 3a.

FIG. 8 illustrates process message 810 communicated in server node 604 to an adaptation and/or analog of no-return director component 354 to process the command identified in first request message 808.

No-return director component 554 in FIG. 5 may be invoked to determine whether a command response should be sent for a command identified in a request message before invoking a command handler component 516, during processing of an operation included in performing the command by a command handler component 516, and/or after processing of the command by a command handler 516. No-return director component 554 may be invoked in response to receiving and/or otherwise detecting no-return-request information. No-return-request information may be received in response to and/or otherwise based on a no-return markup element, sent to the user agent node 602, defined to identify the no-return-request information and/or an instruction for executing by the user agent node for sending the no-return-request information. A message, such as first request message 808, may be received by web application 504 and no-return-request information that may be included in the message may be received by no-return director component 554 via request-in component 552, controller 512, a command handler 516, a response generator 520, and/or other component(s) included in processing the message. Some or all of the no-return-request information may be included in and/or otherwise identified by a no-respond header defined to indicate that a command identified in a request message is a non-returnable command. Some or all of the no-return-request information may be identified based on command information in first request message 808.

As described above, no-return-request information may include a MIME-type identifier defined to indicate a command is a non-returnable command. A server node may determine that a command identified in a request message is a non-returnable command based on the MIME-type identifier. HTTP request 1100a in FIG. 11a includes an "empty/*" MIME type identifier 1108a. In FIG. 5, no-return director component 554 interoperating with controller 512 may detect MIME type identifier 1108a and determine the first command in HTTP request 1100a identifies a non-returnable command. "empty/*" MIME type 1108a may define a content type acceptable in an HTTP response to HTTP request 1100a. The content type identifies no command response for a user agent that sent the command.

Also described above, no-return-request information may include and/or otherwise identify an HTTP method token defined to indicate that no command response, to a command identified in an HTTP request including the HTTP method token, is to be sent by the server for delivery to a user agent. The HTTP method token, "POST-NO-RETURN" specified in FIG. 9b as the value 912b of a method attribute defined in this manner is described above.

No-return-request information, such as a MIME type and/or an HTTP method token identified in no-return-request information, may further indicate to a server node that no command response is to be generated by the server. No-return-request information, such as a MIME type and/or an HTTP method token identified in no-return-request information, may indicate to a server that no response message is to be sent for a request message.

No-return-request information may identify a no-return-request condition for evaluating by a server node and/or may be included in evaluating a no-return-request condition. In an aspect, a no-return-request condition may identify a temporal condition for evaluating by a server node. For example, no-return-request information processed by no-return director component 554 in FIG. 5 may identify a duration of time for processing and responding to a command received in a request message. The condition may be met when the command cannot be processed and/or responded to within the specified duration of temporal condition. The command may be determined to be a non-returnable command by the server node in response to determining that the no-return-request temporal condition is met.

A command handler 516 for a command may determine that the command received in a request message cannot and/or has not been processed in the specified duration. In response, the command handler 516 may interoperate with no-return director component 554 to determine the command is a non-returnable command.

In an aspect, a server node might not send a response message to a request message identifying a non-returnable command sent from the user agent. Thus, the user agent node might not receive a response message for the request message. For example, a request message may be exchanged between a user agent node and server node via a connection in connection-oriented protocol, such as a Transmission Control Protocol (TCP) connection according to the TCP protocol. Either or both no-return director component 554 operating in server node 604 and no-response director component 464 operating in user agent node 602 may send no command response, for a command to browser 404 and/or web application agent 406 as user agent(s) for the first command sent in first request message 808 via the TCP connection 808, by deactivating the connection subsequent to exchanging the first request message 808. The connection may be closed, aborted, or discarded preventing any command response from being communicated between web application 504 and browser 404 via the connection. No-response director component 464 may deactivate the connection after sending first request message as indicated by setting of the no-return indicator by no-response detector component 462 described above. No-return director component 554 may deactivate the connection in response to receiving the no-return-request information in first request message 808.

In an aspect, both nodes may attempt to deactivate the connection. An adaptation of some or all the components in FIG. 3*a* operating external to web application 504, such in HTTP layer 510 may operate analogously. An adaptation or some or all the component in FIG. 3*a* and/or in FIG. 3*b* operating in a node in a network path between user agent node 602 and server node 604 may also be configured to deactivate the connection as described or in any other suitable manner. User-agent node 602 may provide information in no-return-request information to indicate to server node 604 to deactivate the connection, to inform server node 604 that user agent node 602 will deactivate the connection, and/or to negotiate which node will deactivate the connection.

In other aspects, the connection for exchanging first request message 808 may be left open for subsequent communication between user agent node 602 and a server node 604. User agent node 602 may send a second request message identifying a second command to server node 604 after sending first request message 808. Server node 604 may send a response message to the second request message, in response to receiving the second request message. User agent node 602 may receive the response message. The second request message and its response message may be exchanged via the same connection by which first request message was transmitted or may be exchanged via different connection. The response message to the second request message does not include any portion of any command response for the non-returnable command sent in first request message 808.

Sending no command response may include sending, in a first response message, the no-return-response information, based on the no-return-request information, to configure a node in a network path between the server and the user agent for sending no command response to the first command for delivery from the server to a user agent. For a receiver of the response message including no-return response information, sending no command response may include receiving the response message and not forwarding an included command response to a user agent that sent the corresponding command in response to detecting the no-return response information in the response message. Note, the no-return-response information is based the no-return-request information, which is based on setting the no-return indicator for the command, described above.

A server node may include no-return-response information in the response message to the request message to instruct a component in a receiving execution environment to prevent and/or otherwise not send a command response included in the message for delivery to a user agent and/or to inform a receiver of the message that the message doesn't include a command response. Server node 604 may include no-return-response information in first response message 812. No-response director component 464 may be invoked in response to response-in component 460 in user agent node 602 receiving first response message 812 to not send a command response for the non-returnable command identified in first request message 808 to a sending user agent according to the no-return-response information.

The no-return-response information may identify a MIME type specifying a content type identifying no command response to the first command for sending for delivery to the user agent. In FIG. 5, no-return director component 554 operating in server node 604 may communicate with response generator component 520 to instruct response-out component 530 to send first response message 812 as a response to first request message 808. FIG. 11*b* illustrates an exemplary HTTP response 1100*b* to HTTP request 1100*a*. FIG. 11*b* illustrates that no-return-response information may include a MIME type identifier in content-type header 1104*b* to specify a content type identifying no command response for a non-returnable command. "empty/*" MIME type identifier 1102*b* described above may be included in HTTP response 1100*b* to indicate to user agent node 602 that no command response for a user agent is included in HTTP response 1100*b*.

No-response director component 464 in FIG. 4 may receive and/or otherwise detect the no-return-response information and process the response message including not sending a command response to a user agent that sent the corresponding non-returnable command. FIG. 11*b* illustrates a status code 1106*b*. In an aspect, a status code indicating an error condition may be returned to a user agent, in a further aspect.

In another aspect, the received response message may be processed based on a no-return indicator set by no-response detector component 462, as described above. No command response is forwarded to the user agent when the no-return indicator has been set in a no-return location in a data storage medium in execution environment 402. For example, server node 604 may send a response message for a non-returnable command, which may include a command response for a non-returnable command. The response message may be received by user agent node 602. No-response director 464 may be invoked. No-response director 464 may check to see whether a no-return indicator for the command is set indicating a command response for the command is non-returnable. When no-response director 464 determines the no-return indicator is set, the command response may be discarded or processed in some way other than delivering it to a user agent.

As described, setting the no-return indicator may include unsetting and/or removing an indicator for delivering the command response. For example, information for correlating a non-returnable command and its command response may be removed or otherwise not stored in a return location for a command.

Adaptations and/or analogs of the arrangement in FIG. 3*a* that send response messages allow for compatibility with current web applications supporting current HTTP specifications. Sending a HTTP response including no command response and/or including no-return-response information supports current request/response requirements of HTTP.

First response message 812 may be sent from server node 604 to user agent node 602 before, during, and/or after processing the non-returnable command received in first request message 808. Sending before and/or during processing allows user agent node 602 to process a response message for request message 808 before and/or during processing of the non-returnable command.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method for processing a non-returnable command response based on a markup element, the method comprising:
   sending, via a network to a user agent node, a first resource including a no-return markup element for identifying no-return-request information for a first command identified based on the first resource;
   in response to sending the first resource, receiving a first request message identifying, based on the first resource based on at least one of an instruction sent in the first resource and a markup element in the first resource, the first command, requested by a user agent in the user agent node, and including the no-return-request information specified to identify the first command as non-returnable; and
   processing the first command including, in response to receiving the no-return-request information, sending no command response, for the non-returnable first command, for delivery to the user agent.

2. The method of claim 1 wherein the first command is identified based on the first resource based on at least one of an instruction sent in the first resource and a markup element in the first resource.

3. The method of claim 1 wherein the no-return-request information is specified based on at least one of a MIME type identifier and a request message method token.

4. A method for processing a non-returnable command response based on a markup element, the method comprising:
   sending, via a network to a user agent node, a first resource including a no-return markup element for identifying no-return-request information for a first command identified based on the first resource, wherein the no-return-request information is specified based on at least one of a MIME type identifier that defines a content type indicating no command response for the user agent and a request message method token;
   in response to sending the first resource, receiving a first request message identifying the first command, requested by a user agent in the user agent node, and including the no-return-request information specified to identify the first command as non-returnable; and
   processing the first command including, in response to receiving the no-return-request information, sending no command response, for the non-returnable first command, for delivery to the user agent.

5. A method for processing a non-returnable command response based on a markup element, the method comprising:
   sending, via a network to a user agent node, a first resource including a no-return markup element for identifying no-return-request information for a first command identified based on the first resource;
   in response to sending the first resource, receiving a first request message identifying the first command, requested by a user agent in the user agent node, and including the no-return-request information specified to identify the first command as non-returnable; and
   processing the first command including, in response to receiving the no-return-request information, sending no command response, for the non-returnable first command, for delivery to the user agent,
   wherein the no-return-request information indicates at least one of that no command response for the first command is to be generated and that no response message for the first request message is to be transmitted.

6. A method for processing a non-returnable command response based on a markup element, the method comprising:

sending, via a network to a user agent node, a first resource including a no-return markup element for identifying no-return-request information for a first command identified based on the first resource;

in response to sending the first resource, receiving a first request message identifying the first command, requested by a user agent in the user agent node, and including the no-return-request information specified to identify the first command as non-returnable; and processing the first command including, in response to receiving the no-return-request information, sending no command response, for the non-returnable first command, for delivery to the user agent, wherein the first request message is received via a network connection according to a connection-oriented protocol and sending no command response includes deactivating the connection, subsequent to receiving the first request message, to prevent sending a command response to the first command via the connection.

7. A method for processing a non-returnable command response based on a markup element, the method comprising:

sending, via a network to a user agent node, a first resource including a no-return markup element for identifying no-return-request information for a first command identified based on the first resource;

in response to sending the first resource, receiving a first request message identifying the first command, requested by a user agent in the user agent node, and including the no-return-request information specified to identify the first command as non-returnable; and processing the first command including, in response to receiving the no-return-request information, sending no command response, for the non-returnable first command, for delivery to the user agent, wherein the sending no command response includes sending, in a first response message, no-return-response information, based on the no-return-request information, to instruct a component in a node in a network path between the server and the user agent to sending no command response to the first command for delivery from the server to the user agent.

8. A method for processing a non-returnable command response based on a markup element, the method comprising:

receiving, for identifying a first command to a server by a user agent, a first resource including a no-return markup element;

determining based on the no-return markup element that the first command is non-returnable indicating that no command response for the first command is to be sent for delivery from the server to the user agent; and setting, in response to the determination, a no-return indicator in a data storage media to configure a node in a network path including the user agent and the server for sending no command response for the first command for delivery from the server to the user agent;

sending a first request message identifying, based on the first resource based on at least one of an instruction sent in the first resource and a markup element in the first resource, the first command for delivery to the server.

9. A method for processing a non-returnable command response based on a markup element, the method comprising:

receiving, for identifying a first command to a server by a user agent, a first resource including a no-return markup element;

determining based on the no-return markup element that the first command is non-returnable indicating that no command response for the first command is to be sent for delivery from the server to the user agent; and setting, in response to the determination, a no-return indicator in a data storage media to configure a node in a network path including the user agent and the server for sending no command response for the first command for delivery from the server to the user agent;

sending a first request message identifying the first command for delivery to the server, wherein setting the no-return indicator includes providing no-return-request information based on the no-return markup element for including in the first request message.

10. The method of claim 9 wherein the no-return-request information is specified based on at least one of a MIME type and a request message method token.

11. The method of claim 10 wherein the MIME type defines a content type identifying no command response for the user agent.

12. A method for processing a non-returnable command response based on a markup element, the method comprising:

receiving, for identifying a first command to a server by a user agent, a first resource including a no-return markup element;

determining based on the no-return markup element that the first command is non-returnable indicating that no command response for the first command is to be sent for delivery from the server to the user agent; and setting, in response to the determination, a no-return indicator in a data storage media to configure a node in a network path including the user agent and the server for sending no command response for the first command for delivery from the server to the user agent;

sending a first request message identifying the first command for delivery to the server, wherein the first request message is sent via a network connection according to a connection-oriented protocol; and deactivating the connection, based on the no-return indicator and subsequent to sending the first request message, to prevent receiving any command response to the first command via the connection.

13. A method for processing a non-returnable command response based on a markup element, the method comprising:

receiving, for identifying a first command to a server by a user agent, a first resource including a no-return markup element;

determining based on the no-return markup element that the first command is non-returnable indicating that no command response for the first command is to be sent for delivery from the server to the user agent;

setting, in response to the determination, a no-return indicator in a data storage media to configure a node in a network path including the user agent and the server for sending no command response for the first command for delivery from the server to the user agent;

sending a first request message identifying the first command for delivery to the server, and receiving, in a first response message to the first request message, no-return-response information for sending no command response for the first command for delivery from the server to the user agent, in response to setting the no-return indicator.

14. The method of claim 13 wherein the no-return-response information identifies a MIME type specifying a content type identifying no command response to the first command for sending for delivery to the user agent.

15. A method for processing a non-returnable command response based on a markup element, the method comprising:

receiving, for identifying a first command to a server by a user agent, a first resource including a no-return markup element;

determining based on the no-return markup element that the first command is non-returnable indicating that no command response for the first command is to be sent for delivery from the server to the user agent;

setting, in response to the determination, a no-return indicator in a data storage media to configure a node in a network path including the user agent and the server for sending no command response for the first command for delivery from the server to the user agent;

sending a first request message identifying the first command for delivery to the server;

receiving a first command response to the first command in a first response message; and in response to setting the no-return indicator, not sending the first command response to the user agent.

16. A system for processing a non-returnable command response based on a markup element, the system comprising:

a processor, wherein during operation of the system the processor executes an instruction included in the system in at least one of a resource generator component, a request-in component, and a no-return director component;

the resource generator component that during operation of the system is included in sending, via a network to a user agent node, a first resource including a no-return markup element for identifying no-return-request information for a first command identified based on the first resource;

the request-in component that during operation of the system is included in, in response to sending the first resource, receiving a first request message identifying, based on the first resource based on at least one of an instruction sent in the first resource and a markup element in the first resource, the first command, requested by a user agent in the user agent node, and including the no-return-request information specified to identify the first command as non-returnable; and the no-return director component that during operation of the system is included in processing the first command including, in response to receiving the no-return-request information, sending no command response, for the non-returnable first command, for delivery to the user agent.

17. A system for processing a non-returnable command response based on a markup element, the system comprising:

a processor, wherein during operation of the system the processor executes an instruction included in the system in at least one of a resource-in component, a no-response detector component, a no-response director, and a request-out component;

the resource-in component that during operation of the system is included in receiving, for identifying a first command to a server by a user agent, a first resource including a no-return markup element;

the no-response detector component that during operation of the system is included in determining based on the no-return markup element that the first command is non-returnable indicating that no command response for the first command is to be sent for delivery from the server to the user agent;

the no-response director component that during operation of the system is included in setting, in response to the determination, a no-return indicator in a data storage media to configure a node in a network path including the user agent and the server for sending no command response for the first command for delivery from the server to the user agent; and the request-out component that during operation of the system is included in sending a first request message identifying, based on the first resource based on at least one of an instruction sent in the first resource and a markup element in the first resource, the first command for delivery to the server.

18. A non-transitory computer readable medium embodying a computer program, executable by a machine, for processing a non-returnable command response based on a markup element, the computer program comprising executable instructions for:

sending, via a network to a user agent node, a first resource including a no-return markup element for identifying no-return-request information for a first command identified based on the first resource;

in response to sending the first resource, receiving a first request message identifying, based on the first resource based on at least one of an instruction sent in the first resource and a markup element in the first resource, the first command, requested by a user agent in the user agent node, and including the no-return-request information specified to identify the first command as non-returnable; and processing the first command including, in response to receiving the no-return-request information, sending no command response, for the non-returnable first command, for delivery to the user agent.

19. A non-transitory computer readable medium embodying a computer program, executable by a machine, for processing a non-returnable command response based on a markup element, the computer program comprising executable instructions for:

receiving, for identifying a first command to a server by a user agent, a first resource including a no-return markup element;

determining based on the no-return markup element that the first command is non-returnable indicating that no command response for the first command is to be sent for delivery from the server to the user agent;

setting, in response to the determination, a no-return indicator in a data storage media to configure a node in a network path including the user agent and the server for sending no command response for the first command for delivery from the server to the user agent; and sending a first request message identifying, based on the first resource based on at least one of an instruction sent in the first resource and a markup element in the first resource, the first command for delivery to the server.

* * * * *